United States Patent
Singh et al.

(10) Patent No.: US 12,269,006 B2
(45) Date of Patent: Apr. 8, 2025

(54) GAS-SOLID CONTACTING SYSTEM WITH STRUCTURED PACKING

(71) Applicant: HINDUSTAN PETROLEUM CORPORATION LIMITED, Maharashtra (IN)

(72) Inventors: Praveen Kumar Singh, Bengaluru (IN); Pramod Kumar, Bengaluru (IN); Sreejith K.V., Bengaluru (IN)

(*) Notice: Subject to any disclaimer, the term of this patent is extended or adjusted under 35 U.S.C. 154(b) by 358 days.

(21) Appl. No.: 17/674,205

(22) Filed: Feb. 17, 2022

(65) Prior Publication Data
US 2022/0258122 A1 Aug. 18, 2022

(30) Foreign Application Priority Data
Feb. 17, 2021 (IN) .............................. 202121006718

(51) Int. Cl.
*B01J 19/30* (2006.01)
(52) U.S. Cl.
CPC .... *B01J 19/305* (2013.01); *B01J 2219/30284* (2013.01); *B01J 2219/3085* (2013.01); *B01J 2219/3086* (2013.01); *B01J 2219/312* (2013.01)
(58) Field of Classification Search
CPC ............ B01J 19/305; B01J 2219/30284; B01J 2219/3085; B01J 2219/3086; B01J 2219/312; B01J 2219/32206; B01J 2219/32289; B01J 4/004; B01J 2219/32237; B01J 2219/32262; B01J 2219/32279; B01J 2219/32282; B01J 2219/44; B01J 19/32; B01J 8/34
See application file for complete search history.

(56) References Cited

U.S. PATENT DOCUMENTS

| 2,226,535 A * | 12/1940 | Payne ................. B01J 20/3433 |
| | | 202/95 |
| 2,724,686 A * | 11/1955 | Nicholson ............... B01J 8/189 |
| | | 34/147 |
| 6,146,519 A * | 11/2000 | Koves .................... C10G 11/18 |
| | | 208/113 |
| 6,224,833 B1 * | 5/2001 | Rall ....................... C10G 11/18 |
| | | 422/139 |

(Continued)

FOREIGN PATENT DOCUMENTS

| CN | 111632573 A | 9/2020 |
| EP | 3818033 A1 | 5/2021 |
| KR | 20210014130 A | 2/2021 |

*Primary Examiner* — Christopher P Jones
*Assistant Examiner* — Phillip Y Shao
(74) *Attorney, Agent, or Firm* — Bradley Arant Boult Cummings

(57) ABSTRACT

A gas-solid contacting system (100) with structured packing (108) is disclosed. The structured packing (108) comprises a gas header (102) with an inlet to receive a gas. A plurality of vertically aligned tubes (104) is fluidically connected to the gas header (102), wherein each vertically aligned tube (104) comprises openings (180) to distribute the gas at different heights in a radial direction. A structured packing element (106) is arranged on each vertically aligned tube (104), wherein the structured packing element (106) comprises one or more plates attached to the vertically aligned tube (104) to create a convoluted 3-dimensional flow path for smooth flow and radial distribution of a solid particulate stream.

19 Claims, 7 Drawing Sheets

(56) References Cited

U.S. PATENT DOCUMENTS

| | | | |
|---|---|---|---|
| 2007/0145611 A1* | 6/2007 | Lee | B01D 45/08 |
| | | | 261/114.1 |
| 2016/0375419 A1* | 12/2016 | Pretz | C10G 11/00 |
| | | | 422/143 |
| 2017/0001163 A1* | 1/2017 | Pretz | B01J 8/008 |

* cited by examiner

GAS-SOLID CONTACTING SYSTEM WITH STRUCTURED PACKING

CROSS-REFERENCE TO RELATED APPLICATION

This application claims priority to Indian Patent Application 202121006718, filed on Feb. 17, 2021, and entitled "GAS-SOLID CONTACTING SYSTEM WITH STRUCTURED PACKING," which is incorporated herein by reference in its entirety.

BACKGROUND OF THE INVENTION

The present subject matter relates generally to gas-solid contacting systems and in particular to structured packing used in a gas-solid contacting system.

BRIEF SUMMARY OF THE INVENTION

Gas-solid contacting systems are used in various mass transfer applications, such as drying, stripping, etc. In one example, fluid catalytic cracking reaction apparatuses use gas-solid contacting systems for recovering adsorbed products from the catalyst prior to catalyst regeneration. Fluid catalytic cracking (FCC) is a chemical process that utilizes a catalyst and heat to break hydrocarbon feed that contains long-chain hydrocarbons into smaller-chain hydrocarbons. Once the hydrocarbon feed is cracked by the catalyst and heat, the resultant effluent stream is sent to a fractionator that separates the effluents based on boiling points into several FCC products, for example, gasoline, light and heavy gas oils, slurry oil, and butane and lighter hydrocarbons. The catalyst that is separated from the hydrocarbon products in the FCC reactor is referred to as spent catalyst. The spent catalyst typically has substantial quantity of hydrocarbons adsorbed on it, which is recovered by a process referred to as stripping. These hydrocarbons are stripped out of the catalyst stream in a stripping section with the help of steam before routing the spent catalyst to a regenerator. The stripping section includes a gas-solid contacting system for increasing contact between the catalyst stream and steam.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components where possible.

DETAILED DESCRIPTION OF THE INVENTION

Figure 1A:
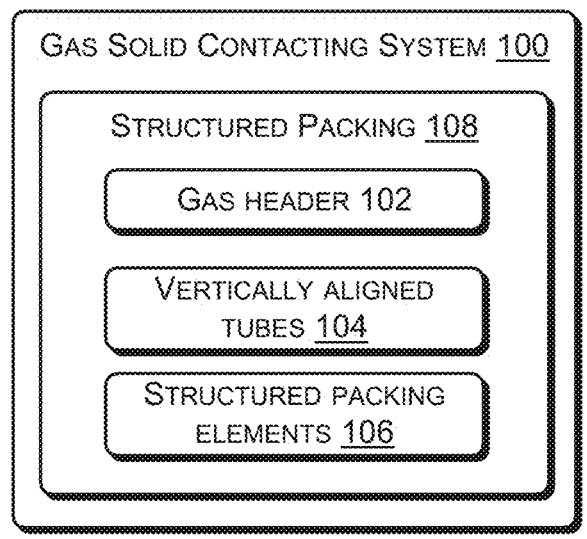
FIG. 1(a) illustrates a block diagram of a gas-solid contacting system, in accordance with an embodiment of the present subject matter.

The present subject matter relates generally to efficient gas-solid contacting for mass transfer, such as, for stripping of spent catalyst or drying of solid particulate matter. While the following discussion is provided with reference to gas-solid contacting system for steam stripping of spent catalyst recovered from a Fluid Catalytic Cracking (FCC) reactor, it will be understood that the gas-solid contacting system of the present subject matter may be used in other applications as well wherever catalyst or other solid particles have to be contacted with a gas, such as steam or air, for mass transfer, for example, for drying of solid particles using a hot gas etc.

Stripping of spent catalyst is an important step in the FCC process. Spent catalyst from a reactor of the FCC carries a significant amount of hydrocarbon products that are trapped between the spent catalyst particles and adsorbed on their surface. These hydrocarbons are stripped out of the catalyst stream in a stripper section with the help of steam before routing the spent catalyst to the regenerator.

Catalyst stripping helps in maximizing the yields of useful products by minimizing the slippage of valuable hydrocarbons to the regenerator. Moreover, if these hydrocarbons are not recovered via catalyst stripping, they end up in the regenerator where they are combusted along with coke and increase the regenerator temperature. Excessive temperatures in the regenerator have a negative impact on the activity of the catalyst and force the operator to maintain lower cat-oil ratio which in turn reduces the conversion.

Typically, the stripping of spent catalyst is achieved by creating a bubbling fluidized bed of spent catalyst and passing steam in counter-current manner against the down flowing spent catalyst. This steam, together with recovered hydrocarbons, joins the product vapour stream and is routed to the main fractionator. To improve the stripping efficiency, various internals or packings are commercially employed in the stripper section, for example, disk and donuts, baffles, sheds etc. These internals manipulate the spent catalyst flow path to enhance the radial distribution of the catalyst and increase the catalyst residence time. However, the major drawback of these internals is that they substantially reduce the volume available for mass exchange which increases the likelihood of flooding at increasing solid flux.

Other drawbacks of using the conventional internals for stripper section include catalyst maldistribution and gas bypassing in which catalyst and gas simply pass through some sections of the stripper without contacting each other which results in defluidized zones of catalyst.

The present subject matter relates to a gas-solid contacting system for stripping of spent catalyst in an FCC reactor having structured packing. The structured packing includes a gas header, a plurality of vertically aligned tubes, and structured packing elements arranged on the vertically aligned tubes. The gas header may be a ring-like circular hollow tube including an inlet to receive the gas.

The plurality of vertically aligned tubes is fluidically connected to the gas header. The vertically aligned tubes include openings at different heights of the tubes to distribute the gas received from the gas header in radial direction.

The structured packing elements are arranged internally or externally on the plurality of vertically aligned tubes. For discussion purposes, vertically aligned tubes are interchangeably referred to as tubes herein. Each structured packing element includes one or more plates that can be arranged internally or externally on a tube to cause solid particulates to flow down along the length of the tube. Accordingly, a 3-dimensional flow path is created for smooth flow and radial distribution of the solid particulates. In an example, the structured packing includes a connecting rod to which one or more structured packing elements are connected radially or linearly in series in such a way that the down flowing solid particulate stream travels in clockwise direction in one row and travels in a counter-clockwise direction in the next row.

In an example, the one or more plates of a structured packing element are twisted in a clockwise or an anticlockwise direction around a vertically aligned tube forming a helix like structure of the structured packing element. In another example, the one or more plates are arranged on the surface of the vertically aligned tube in a clockwise or an anticlockwise direction discontinuously at multiple positions in a spiral and step wise manner. For example, the plates may be arranged at an angle of 30°, 45°, or 60° to the vertically aligned tube. In another example, the one or more plates are twisted and connected to the inner wall of a vertically aligned tube forming an inner helical structure as the structured packing element. In yet another example, the one or more plates are arranged across the longitudinal peripheral surface of the vertically aligned tube to form the structured packing element.

The gas-solid contacting system with structured packing of the present subject matter provides a solution to the problems of solid (such as catalyst) maldistribution and gas bypassing and flooding by using the structured packing element as disclosed herein. The structured packing element with plate configurations provides a large free volume for gas-solid mass transfer, improves solid distribution, and controls gas bubble size. The structured packing element also considerably reduces inactive volume of the gas-solid contacting system and avoids the formation of dead or defluidized zones.

Aspects of the present subject matter are further described in conjunction with the appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and implementations of the present subject matter, as well as specific examples thereof, are intended to encompass equivalents thereof.

FIG. 1(a) illustrates a block diagram of a gas-solid contacting system 100, in accordance with an embodiment of the present subject matter. The gas-solid contacting system 100 includes a gas header 102, a plurality of vertically aligned tubes 104 fluidically connected to the gas header 102, and structured packing elements 106 arranged internally or externally on the plurality of vertically aligned tubes 104, thereby forming a structured packing 108. In one example, the structured packing 108 may be disposed in a shell (not shown in this FIG.) that forms the body of the gas-solid contacting system and may be open at the top and bottom.

In one example, the shell may include a concentric internal pipe to allow a riser reactor to pass through the gas-solid contacting system 100. The structured packing 108 formed by the gas header 102, the plurality of vertically aligned tubes 104, and the structured packing elements 106 may be disposed in the annular portion in the shell. In another example, the shell may not have an internal pipe and the structure packing 108 may be disposed in the internal volume enclosed by the shell.

In one example, a plurality of structured packings 108 may be positioned in the annular portion or internal volume of the shell. For example, a first gas header may be formed as a ring with a plurality of spaced outlets on a first surface of the ring while a second surface of the ring, which is opposite to the first surface, may include one or more inlets to receive the gas. The tubes may be connected to the ring-like first gas header at the outlets such that each tube is placed vertically over one outlet of the first gas header. The tubes may have a plurality of openings provided along their length at different heights and in different directions and the structured packing elements may be arranged on the tubes, thus forming a first structured packing. A second structured packing may be similarly formed with a second ring-like gas header having a different diameter than the first ring-like gas header. The first and second structured packings may be positioned concentrically adjacent to each other in the shell, thus creating multiple flow paths for gas-solid contacting in the shell. Other manners of disposing a plurality of structured packings in the shell may also be implemented, albeit with minor variations, as will be understood. For example, the gas headers may be formed as linear tubes instead of rings and the hence the structured packings may have a linear structure and maybe arranged in rows adjacent to each other instead of being arranged in a concentric manner.

Further, in one example, a plurality of gas-solid contacting systems 100 may be stacked vertically over each other to form a series of gas-solid contacting systems for enhanced mass transfer between the gas and the solid. Each gas-solid contacting system in the stack may therefore be a stage through which the solid particulates and the gas are passed.

Figure 1B:
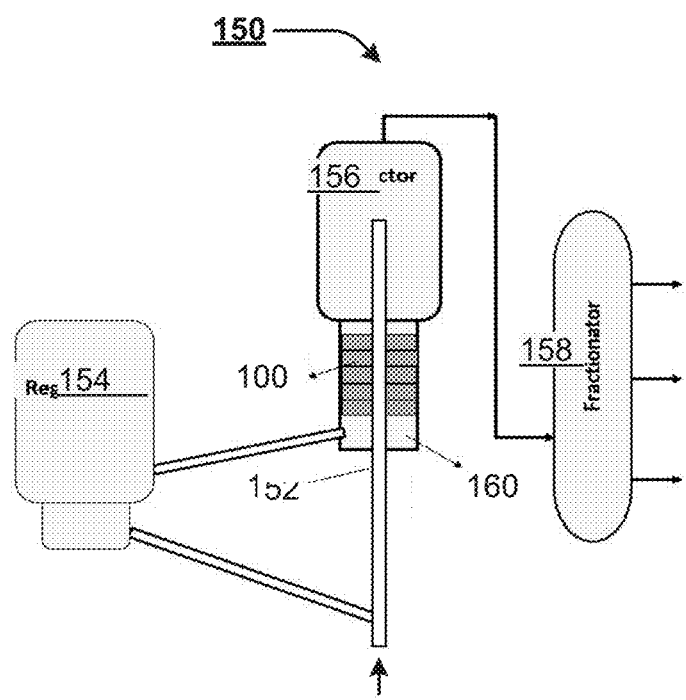
FIG. 1(b) illustrates implementation of a gas-solid contacting system implemented in a stripping section of an example FCC apparatus, in accordance with an embodiment of the present subject matter.

FIG. 1(b) illustrates implementation of a gas-solid contacting system in a stripping section of an example FCC apparatus, in accordance with an embodiment of the present subject matter. An FCC apparatus 150 includes a riser reactor 152 (also referred to as riser 152) which receives a catalyst stream from a regenerator 154 and a hydrocarbon feed for cracking from the bottom of the riser 152. The feed and the catalyst rise through the riser reactor 152 where the cracking reactions occur. The riser 152 opens into a separator reactor 156, which may be a cyclone reactor. At the separator reactor 156, the reacted gas stream is separated from the catalyst stream and is fed to the fractionator 158 where various products are recovered. The catalyst stream separated in the separator reactor 156 flows downwards by gravity into the stripping section 160 for stripping of the catalyst.

The stripping section 160 may include one or more gas-solid contacting systems 100 stacked vertically over each other. Each gas-solid contacting system 100 receives the catalyst stream from top and steam from a steam inlet pipe (not shown in the FIG.) that connects to the gas header of the gas-solid contacting system 100. The catalyst stream flows downwards through the gas-solid contacting system 100 by gravity and follows the 3D radial flow-path created by the structured packings present in the gas-solid contact systems. The steam is radially distributed through the vertically aligned tubes and flows generally upwards through the gas-solid contacting system 100, thereby coming into close contact with the catalyst stream. The steam with entrained hydrocarbons stripped from the catalyst rises into the separator reactor 156 and gets mixed with the reacted gas that is sent to the fractionator 158. The catalyst stream, after stripping, is sent to the regenerator 154 from the base of the stripping section 160. The catalyst gets regenerated in the regenerator 154 and is sent back to the riser 152.

Thus, the gas-solid contacting system 100 of the present subject matter may be used in FCC apparatus for increasing hydrocarbon recovery in the stripping section. Similarly, the gas-solid contacting system 100 of the present subject matter may be used in other applications where contact between a solid particulate stream and a gas stream has to be enhanced for better mass transfer.

Figure 1C:
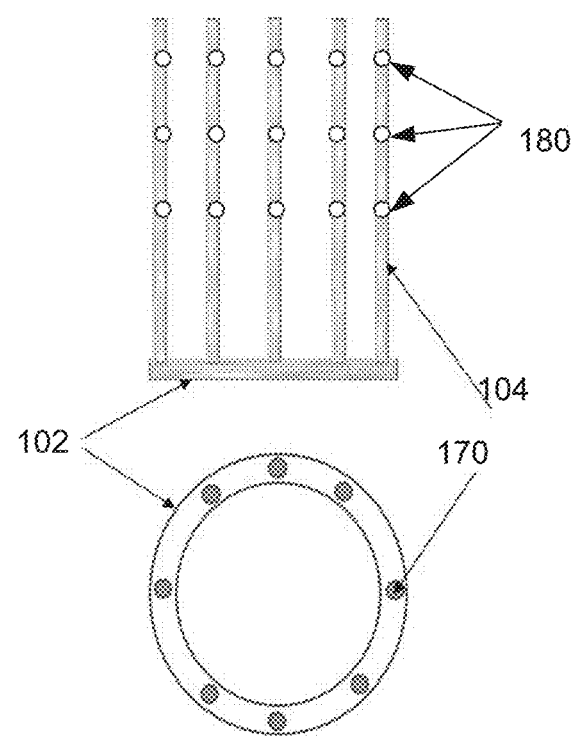
FIG. 1(c) illustrates an example gas header and a plurality of vertically aligned tubes of a packing of a gas-solid contacting system, in accordance with an embodiment of the present subject matter.

FIG. 1(c) illustrates an example gas header and a plurality of vertically aligned tubes of a packing of a gas-solid contacting system, in accordance with an embodiment of the present subject matter.

In one example, the gas header 102 may be a ring-like structure including a plurality of outlets 170 provided in a spaced apart manner around a first surface of the gas header 102. Further, an inlet (not shown in the FIG.) may be provided on a second surface opposite to the first surface to receive the gas. The plurality of vertically aligned tubes 104 are fluidically connected to the gas header 102 such that a tube 104 is placed over an outlet 170. The vertically aligned tubes 104 include openings 180 at different heights (vertical positions) to distribute the gas received from the gas header in a radial direction. In addition to the openings 180 shown in the figure, there may be other openings that may open in different directions. In one example, the diameter of each of the vertically aligned tubes can be from 0.1 inch to 5 inch. In another example, the diameter of each of the vertically aligned tubes can be 0.5 inch, 1 inch, or 2 inch. In an example, the openings 180 in the tubes 104 for distributing gas at different vertical positions can be of any dimension ranging from 0.1 mm to 10 mm, but preferably 1, 2, or 3 mm.

As discussed earlier, the structured packing element 106 includes one or more plates that are arranged internally or externally on a tube 104 to create a 3-dimensional flow path for smooth flow and radial distribution of the solid particulates interchangeably referred to as catalyst or spent catalyst.

Figure 2A:
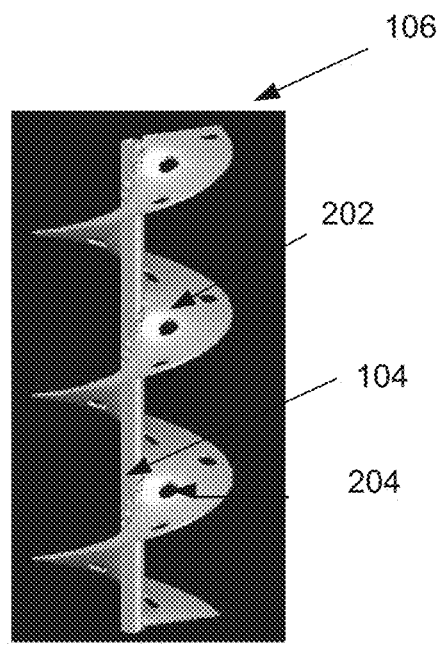
FIG. 2(a) illustrates an example structured packing element of a packing of a gas-solid contacting system, in accordance with an embodiment of the present subject matter.

FIG. 2(a) illustrates an example structured packing element of a packing of a gas-solid contacting system, in accordance with an embodiment of the present subject matter. In an example, as shown in FIG. 2(a), a structured packing element 106 may include a single twisted plate 202 forming a helical flow path around the tube 104. The tube 104 that distributes gas, interchangeably referred to as steam, radially into the helical flow path. In an example, the plate 202 may be attached to the tube 104 by welding or mounting using bolts. The twisting of the plate 202 creates a number of turns, so that the spent catalyst flowing downwards from the top travels along the plate surface and creates 3-Dimensional path as it flows down. This substantially improves the catalyst residence time and radial distribution of the spent catalyst. The plate can be twisted to create the turns in either clockwise or counter clockwise direction. Based on the direction of the turn, the spent catalyst will travel either clock wise or counter clock wise. The plate 202 can also include multiple holes 204 on its surface which help in breaking the steam bubbles traveling upwards in the gas-solid contacting system. In an example, the holes 204 are arranged in triangular tessellations, to minimize the chances of bubble coalescence.

During operation, the down flowing spent catalyst comes in contact with a stream of counter current steam that flows upwards after having contacted catalyst and a stream of fresh cross current steam that is distributed from the openings 180 on the tube 104. This improves the contact area and mass exchange efficiency between the steam and the spent catalyst. The plate 202 also helps in aligning the path of spent catalyst according to the openings 180 of the tube 104. The plate 202 additionally helps to control the size of steam bubbles, in the fluidized bed, by breaking them at fixed intervals of space.

In an example, the geometry of the plate 202 can be defined by width (w), height (h), number of twists (N) and diameter of hole (d) in the plate 202. In an example, the width (w) of the plate 202 can be any value ranging from 10 mm to 1000 mm, but preferably 200 mm, 300 mm or 400 mm. In an example, the height (h) of the plate 202, can range from 100 mm to 2000 mm, but preferably 500 mm, 750 mm or 1000 mm. In an example, the plate 202 may have at least one turn, but preferably there can be 2 or 3 turns. In an example, the diameter of the hole d, can range from 1 mm to 100 mm, but preferred values are 30 mm, 40 mm or 50 mm. The holes in the plate 202 can have circular, rectangular or any other geometry.

Figure 2B:
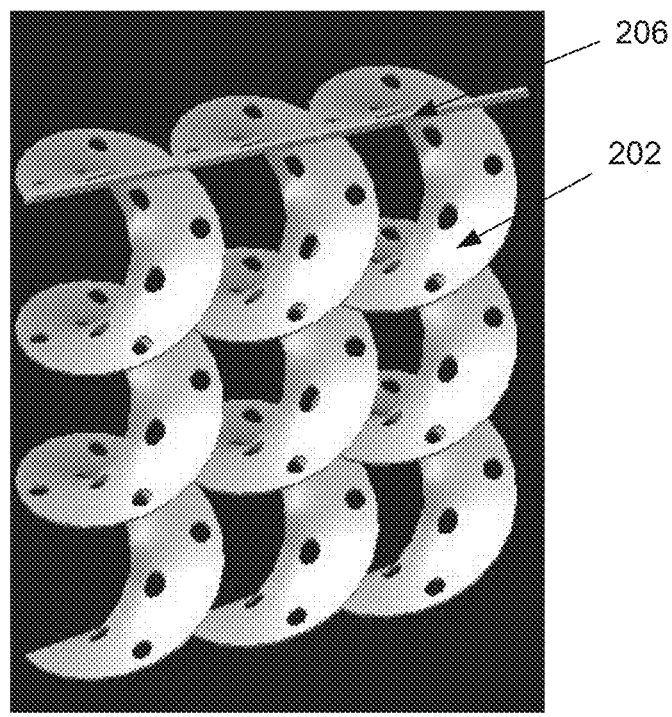
FIGS. 2(b) and 2(c) illustrate example structured packings formed from the structured packing element of FIG. 2(a), in accordance with an embodiment of the present subject matter.
Figure 2C:
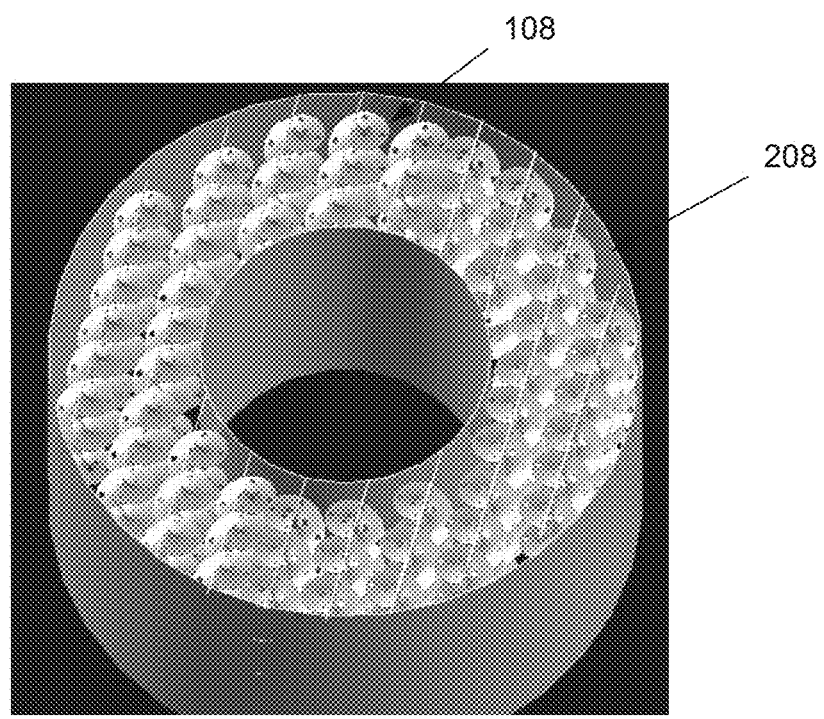

FIGS. 2(b) and 2(c) illustrate example structured packings formed from the structured packing element of FIG. 2(a), in accordance with an embodiment of the present subject matter. For ease of representation, the tubes 104 are not shown, however, it will be understood that each plate 202 will be positioned on a tube 104. A connecting rod 206 may be used for connecting the top end of the plate 202 of different structured packing elements 106 to form the structured packing 108 as a series of structured packing elements. In an example, the plates in the series may be arranged in such a way that two adjacent plates are twisted in opposite directions (i.e., clock wise and anticlockwise) to ensure additional radial distribution of spent catalyst in a stripper cross section. In another example, the plates may be twisted in the same direction.

Further, a number of such series of plates 202 may be positioned in the annular portion of a shell 208 to form multiple rows of structured packing element 106, to obtain the gas-solid contacting system 100 with structured packing 108 as shown in FIG. 2(c). In one example, multiple stages of gas-solid contacting systems with structured packings may be stacked one over the other in such a way that the catalyst flow path curvature changes from one stage in the stack to another. For example, the catalyst may travel in clockwise direction in a first stage of the stack, in counterclockwise direction in a second stage below the first stage, in clockwise direction in a third stage below the second stage, and so on. This arrangement helps in increasing the residence time of spent catalyst by decelerating the down flowing spent catalyst. This arrangement also ensures the maximum utilization of stripping zone volume. In an example, by using this type of structured packing, 90-95% of the stripping section volume can be made active and available for stripping. In an example, the structured packing element described here, formed by twisted plates with holes to create a 3D path for the spent catalyst, can be used in the FCC stripping zone even without the stacking arrangement.

Figure 3A:
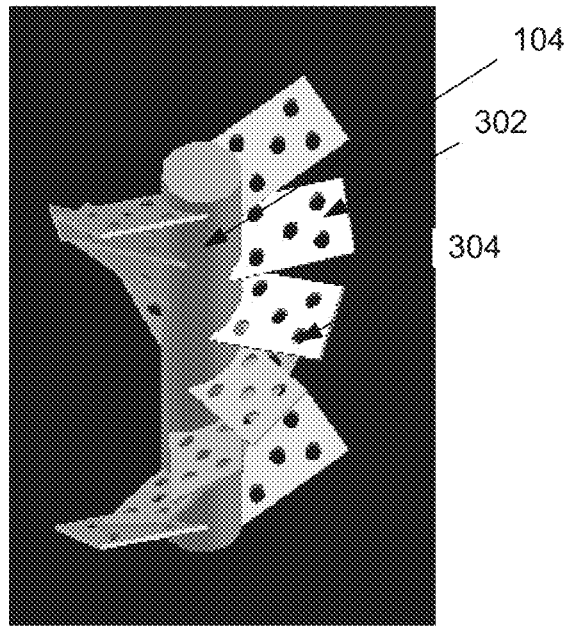
FIG. 3(a) illustrates another example structured packing element of a packing of a gas-solid contacting system, in accordance with an embodiment of the present subject matter.
Figure 3B:
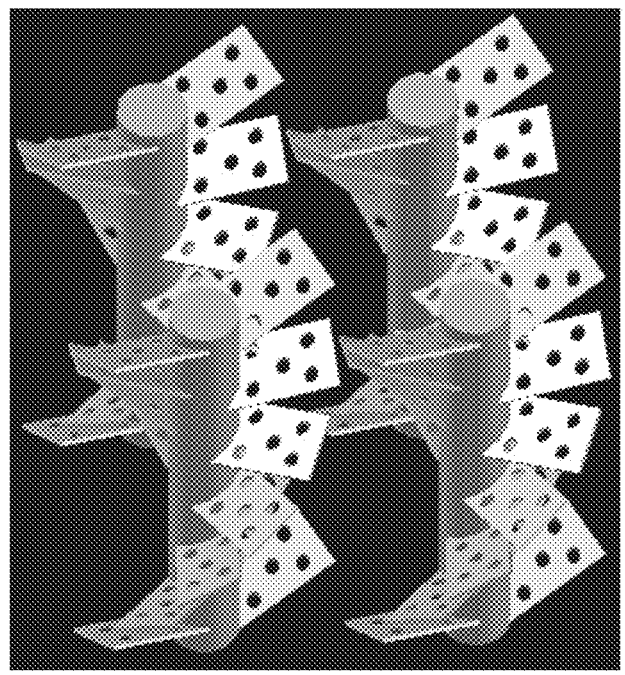
FIG. 3(b) illustrates a part of an example structured packing formed from the structured packing element of FIG. 3(a), in accordance with an embodiment of the present subject matter.

FIG. 3(a) illustrates another example structured packing element of a packing of a gas-solid contacting system, in accordance with an embodiment of the present subject matter; and FIG. 3(b) illustrates a part of an example structured packing formed from the structured packing element of FIG. 3(a), in accordance with an embodiment of the present subject matter.

As shown in the FIGS. 3(a) and 3(b), the structured packing element 106 may be formed by a plurality of plates 302 that may be arranged in clockwise or anticlockwise direction discontinuously at multiple positions in a spiral and stepwise manner on the surface of a tube 104. Each plate 302 may include holes 304 for steam flow and bubble breaking similar to the holes 204. In an example, the plates 302 are welded at different positions of the vertically aligned tube 104. In an example, the plates 302 makes an angle with a surface of the vertically aligned tube 104. In an example, the angle can be 30°, 45°, or 60°. During operation, the spent catalyst that travels down in the gas-solid contacting system, flows from one plate to another plate traveling over the plate surface and around the vertically aligned tube 104 to form a 3D path.

In an example, one set of plates 302 containing holes 304 are placed on the vertically aligned tube 104 and lined opposite to another set of plates on an adjacent vertically aligned tube 104, as shown in FIG. 3(b). This arrangement helps in creating multiple and opposite catalyst paths, thus improving the radial distribution of spent catalyst. In an example, a number of such structured packing elements are arranged radially within the shell of the gas-solid contacting system 100 to obtain a series of structured packing elements forming the structured packing. In an example, the gas-solid contacting systems with structured packings may also be stacked vertically as discussed earlier.

Figure 4:
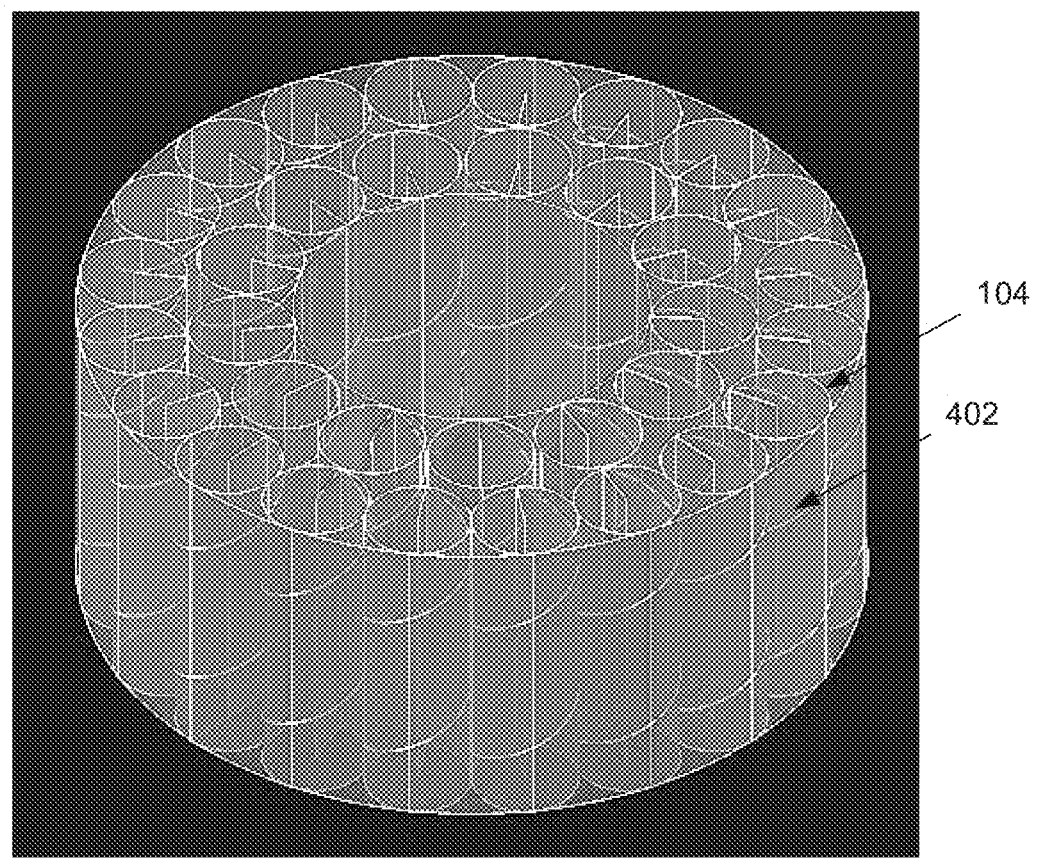
FIG. 4 illustrates an example structured packing formed from yet another example structured packing element, in accordance with an embodiment of the present subject matter.

FIG. 4 illustrates an example structured packing formed from yet another example structured packing element, in accordance with an embodiment of the present subject matter. A structured packing element 106 may be a twisted plate 402 with holes, similar to the plate 202, but may be attached internally, i.e., to the inner wall, in a tube 104. A plurality of such tubes with the structured packing element may be disposed in the annular portion of the shell 400 to form a structured packing. The vertically aligned tubes with plates attached to the inner wall also helps in ensuring that the spent catalyst sticks to the surface of the twisted plate and does not fall freely downwards. In an example, the gas-solid contacting systems with structured packings may also be stacked vertically as discussed earlier.

Figure 5:
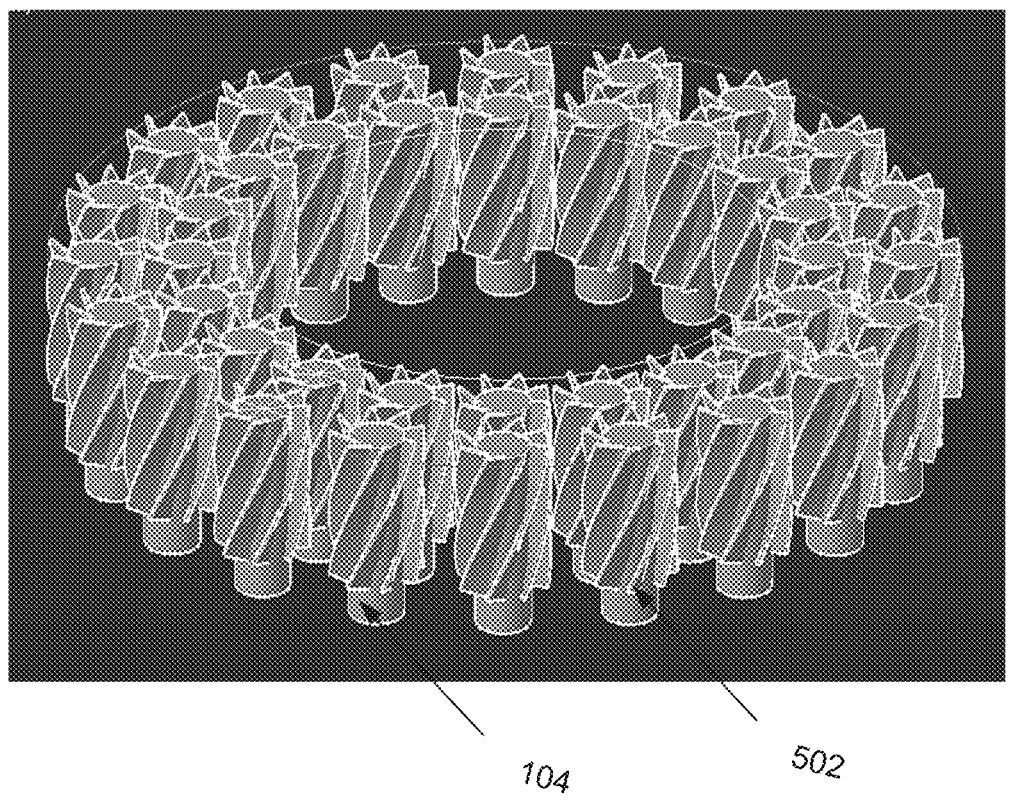
FIG. 5 illustrates an example structured packing formed from yet another example structured packing element, in accordance with an embodiment of the present subject matter.

FIG. 5 illustrates an example structured packing formed from yet another example structured packing element, in accordance with an embodiment of the present subject matter. An example structured packing element includes one or more plates 502 that are arranged around the periphery of the vertically aligned tube 104. The plates 502 may also include holes as discussed earlier for other embodiments. Further, in each structured packing element, the plates may be arranged longitudinally across the periphery of a tube 104 to obtain a number of substantially parallel 3-D paths for the spent catalyst formed around a single vertically aligned tube 104. A plurality of the structured packing elements may be arranged to form a structured packing in a manner similar to that discussed above for other embodiments.

For ease of representation, the gas header may not be shown in some of the figures, however, it will be understood that each tube in the structured packing will be connected to a gas header for receiving the gas. It will be understood that the various embodiments as discussed above are example embodiments for implementing the teachings of the present subject matter and other variations may also be evident to a person skilled in the art from these teachings. Therefore, the present subject matter discloses various types of structured packings which provide large free volume for gas-solid mass transfer, improve catalyst distribution and control gas bubble size. The structured packings also considerably reduce an inactive volume of the gas-solid contacting system and avoid formation of dead or defluidized zones. The present subject matter also aims to solve the problems of catalyst maldistribution, gas bypassing, and flooding in FCC strippers through various structured packings discussed above.

Although the subject matter has been described in considerable detail with reference to certain examples and implementations thereof, other implementations are possible. As such, the scope of the present subject matter should not be limited to the description of the preferred examples and implementations contained therein.

What is claimed is:

1. A gas-solid contacting system with structured packing (108), the structured packing (108) comprising:
 a gas header (102) with an inlet to receive a gas;
 a plurality of vertically aligned tubes (104) fluidically connected to the gas header (102), wherein each vertically aligned tube (104) comprises openings (180) to distribute the gas at different heights in a radial direction; and
 a structured packing element (106) arranged on each vertically aligned tube (104), wherein the structured packing element (106) comprises one or more plates attached to the vertically aligned tube (104) to create a convoluted 3-dimensional flow path of a solid particulate stream.

2. The gas-solid contacting system as claimed in claim 1, wherein the one or more plates are twisted in clockwise or anticlockwise direction continuously around a vertically aligned tube (104).

3. The gas-solid contacting system as claimed in claim 1, wherein the one or more plates are arranged on the surface of a vertically aligned tube (104) in clockwise or anticlockwise direction discontinuously at multiple positions in a spiral and step wise manner, and wherein the one or more plates are provided at an angle to the vertically aligned tube (104).

4. The gas-solid contacting system as claimed in claim 3, wherein the one or more plates are arranged at an angle of 30°, 45°, or 60° to the vertically aligned tube (104).

5. The gas-solid contacting system as claimed in claim 1, wherein the one or more plates are twisted and attached internally to an inner wall of a vertically aligned tube (104).

6. The gas-solid contacting system as claimed in claim 1, wherein the one or more plates are arranged longitudinally around a periphery of a vertically aligned tube (104).

7. The gas-solid contacting system as claimed in claim 1, wherein the structured packing (108) comprises a connecting rod (206) to which one or more structured packing elements (106) are connected radially or linearly in series.

8. The gas-solid contacting system as claimed in claim 7, wherein a plurality of structured packings (108) are stacked one over the other in such a way that the down flowing solid particulate stream travels in a clockwise direction in one stage and travels in counter-clockwise direction in an adjacent stage.

9. The gas-solid contacting system as claimed in claim 1, wherein the one or more plates are arranged on the vertically aligned tubes (104) by welding or mounting with bolts.

10. The gas-solid contacting system as claimed in claim 1, wherein each of the plates comprises one or more holes (204, 304) on the surface of the plate.

11. The gas-solid contacting system as claimed in claim 10, wherein the geometry of the holes (204, 304) is circular or polygonal.

12. The gas-solid contacting system as claimed in claim 1, wherein the diameter of the vertically aligned tube (104) ranges from 0.1 inch to 5 inch.

13. The gas-solid contacting system as claimed in claim 1, wherein the geometry of the openings (180) is circular or polygonal.

14. The gas-solid contacting system as claimed in claim 1, wherein the dimension of the openings (180) along the tube is in the range of 1 mm to 50 mm.

15. The gas-solid contacting system as claimed in claim 1, wherein the width of the one or more plates is between 10 mm to 1000 mm.

16. The gas-solid contacting system as claimed in claim 1, wherein the length of the one or more plates is between 100 mm to 2000 mm.

17. The gas-solid contacting system as claimed in claim 1, wherein the structured packing (108) is positioned in a shell and comprises a plurality of gas headers (102), each gas header connected to a plurality of vertically aligned tubes (104), and each vertically aligned tube having a structured element (106) attached thereto.

18. The gas-solid contacting system as claimed in claim 1, wherein the gas header (102) is circular ring-like or linear and includes a plurality of outlets (170), wherein each vertically aligned tube (104) is connected to an outlet (170).

19. A stripping section (160) of a FCC (Fluid Catalytic Cracking) reactor comprising a stack of gas-solid contacting systems (100) as claimed in any one of claims 1-17 forming a plurality of stages for gas-solid contact.

* * * * *